(12) United States Patent
Jinno

(10) Patent No.: US 10,397,475 B2
(45) Date of Patent: Aug. 27, 2019

(54) CAPTURING CONTROL APPARATUS AND METHOD OF CONTROLLING THE SAME

(71) Applicant: CANON KABUSHIKI KAISHA, Tokyo (JP)

(72) Inventor: Takayuki Jinno, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/696,585

(22) Filed: Sep. 6, 2017

(65) Prior Publication Data

US 2018/0091734 A1    Mar. 29, 2018

(30) Foreign Application Priority Data

Sep. 26, 2016 (JP) ................. 2016-187474

(51) Int. Cl.
| | |
|---|---|
| *G06T 3/00* | (2006.01) |
| *G06T 5/00* | (2006.01) |
| *H04N 5/225* | (2006.01) |
| *H04N 5/232* | (2006.01) |
| *H04N 5/235* | (2006.01) |
| *H04N 5/262* | (2006.01) |

(52) U.S. Cl.
CPC ....... *H04N 5/23238* (2013.01); *G06T 3/0006* (2013.01); *G06T 5/009* (2013.01); *H04N 5/2258* (2013.01); *H04N 5/2355* (2013.01); *H04N 5/2628* (2013.01); *G06T 2207/20221* (2013.01)

(58) Field of Classification Search
CPC .............................. G06T 3/0006; H04N 5/2258
See application file for complete search history.

(56) References Cited

U.S. PATENT DOCUMENTS

| | | | |
|---|---|---|---|
| 8,811,811 B1 * | 8/2014 | Wetzel ................. | H04N 5/2355 396/322 |
| 9,578,259 B2 * | 2/2017 | Molina ................ | H04N 5/2258 |

(Continued)

FOREIGN PATENT DOCUMENTS

| | | | |
|---|---|---|---|
| JP | 11098418 A | * | 4/1999 |
| JP | H11098418 A | | 4/1999 |
| JP | 2008109176 A | | 5/2008 |

*Primary Examiner* — Jamie J Atala
*Assistant Examiner* — Michael Robert Cammarata
(74) *Attorney, Agent, or Firm* — Rossi, Kimms & McDowell LLP

(57) ABSTRACT

A capturing control apparatus, method of controlling the capturing control apparatus, and a recording medium storing a program for controlling capturing control apparatus are disclosed. The capturing control apparatus generates a high-dynamic-range moving image by combining a first moving image captured by a first capturing unit and a second moving image captured by a second capturing unit using a first capturing condition and a second capturing condition. A correction parameter is derived for correcting a position shift between a frame image included in a first moving image and a frame image included in a second moving image based on the frame image captured under the second capturing condition. The capturing control apparatus performs geometric correction processing for at least one of the first moving image and the second moving image using the correction parameter, and combines the corrected first moving image and the corrected second moving image.

11 Claims, 16 Drawing Sheets

(56) References Cited

U.S. PATENT DOCUMENTS

| | | | |
|---|---|---|---|
| 9,774,789 B2* | 9/2017 | Ciurea | H04N 5/2258 |
| 9,998,692 B1* | 6/2018 | Griffiths | G02B 27/10 |
| 2005/0013501 A1* | 1/2005 | Kang | G06T 5/50 |
| | | | 382/254 |
| 2008/0095408 A1 | 4/2008 | Yokohata et al. | |
| 2011/0058050 A1* | 3/2011 | Lasang | H04N 5/144 |
| | | | 348/208.4 |
| 2011/0080487 A1* | 4/2011 | Venkataraman | H04N 5/2253 |
| | | | 348/218.1 |
| 2015/0145952 A1* | 5/2015 | Hirata | H04N 5/23206 |
| | | | 348/38 |
| 2015/0348580 A1* | 12/2015 | van Hoff | G11B 19/20 |
| | | | 348/38 |
| 2016/0191815 A1* | 6/2016 | Annau | H04N 5/247 |
| | | | 348/38 |
| 2017/0187956 A1* | 6/2017 | Fink | H04N 5/23206 |
| 2017/0230562 A1* | 8/2017 | Gupta | H04N 5/2355 |
| 2017/0236552 A1* | 8/2017 | Kimura | G11B 27/105 |
| | | | 386/216 |

\* cited by examiner

FIG. 4

| CAPTURING CONDITION SETTING MENU | |
|---|---|
| ☑ CAPTURING CONDITION SETTING 1 | |
| CAMERA BODY NO. | 101 ▼ |
| SHUTTER SPEED | 1/60 ▼ |
| F-NUMBER | 8.0 ▼ |
| ND FILTER | 6 stop ▼ |
| FRAME RATE | 60 ▼ |
| ISO SPEED | 800 ▼ |
| ☑ CAPTURING CONDITION SETTING 2 | |
| CAMERA BODY NO. | 102 ▼ |
| SHUTTER SPEED | 1/60 ▼ |
| F-NUMBER | 8.0 ▼ |
| ND FILTER | NONE ▼ |
| FRAME RATE | 60 ▼ |
| ISO SPEED | 800 ▼ |
| ☐ CAPTURING CONDITION SETTING 3 | |
| ☐ CAPTURING CONDITION SETTING 4 | |
| [ CANCEL ] | [ COMPLETE SETTING ] |

FIG. 5

GEOMETRIC CORRECTION CAPTURING CONDITION SETTING MENU

☑ CAPTURING CONDITION SETTING 1

| | |
|---|---|
| CAMERA BODY NO. | 101 ▼ |
| FRAME NUMBER | 1 ▼ |
| SHUTTER SPEED | 1/60 ▼ |
| F-NUMBER | 8.0 ▼ |
| ND FILTER | NONE ▼ |
| FRAME RATE | 60 ▼ |
| ISO SPEED | 800 ▼ |

☑ CAPTURING CONDITION SETTING 2

| | |
|---|---|
| CAMERA BODY NO. | 102 ▼ |
| FRAME NUMBER | 1 ▼ |
| SHUTTER SPEED | 1/60 ▼ |
| F-NUMBER | 8.0 ▼ |
| ND FILTER | NONE ▼ |
| FRAME RATE | 60 ▼ |
| ISO SPEED | 800 ▼ |

☐ CAPTURING CONDITION SETTING 3

☐ CAPTURING CONDITION SETTING 4

REFERENCE CAMERA BODY NO.    102 ▼

[ CANCEL ]    [ COMPLETE SETTING ]

F I G. 12

| CAMERA BODY NO. | 101 |
| COMPOSITION PARTNER CAMERA BODY NO. | 102 |
| REFERENCE CAMERA BODY NO. | 102 |
| CAPTURING DATE/TIME | yy/mm/dd 00:00:00 |
| GEOMETRIC CORRECTION FRAME | 1 |
| SHUTTER SPEED | 1/60 |
| F-NUMBER | 8.0 |
| ND FILTER | NONE |
| FRAME RATE | 60 |
| ISO SPEED | 800 |
| ∗ | |
| ∗ | |
| ∗ | |

CAPTURING CONTROL APPARATUS AND METHOD OF CONTROLLING THE SAME

BACKGROUND OF THE INVENTION

Field of the Invention

The present invention relates to an image processing technique concerning image composition.

Description of the Related Art

In a capturing apparatus such as a digital camera, if an object has a wide brightness range, shadow-detail loss or highlight-detail loss may occur depending on the dynamic range of a solid-state image sensing element such as a CCD or CMOS sensor. There is known a high-dynamic-range (HDR) composition technology that combines a plurality of images captured under different exposures, thereby generating an image in which shadow-detail loss or highlight-detail loss is suppressed. Japanese Patent Laid-Open No. 11-98418 (patent literature 1) discloses a technique of HDR-combining a plurality of images captured by, using a plurality of sensors, performing synchronous shooting of images divided using a prism under different exposures. Japanese Patent Laid-Open No. 2008-109176 (patent literature 2) discloses a technique of correcting a position shift between a plurality of images and HDR-combining them, thereby suppressing image degradation of a combined image caused by the position shift between the plurality of images.

In a high brightness image to be used in HDR composition, highlight-detail loss readily occurs. In a low brightness image, shadow-detail loss readily occurs. If highlight-detail loss or shadow-detail loss occurs in these images, the accuracy of corresponding point search between images for position shift correction lowers. It is therefore impossible to appropriately apply position shift correction as described in patent literature 2.

SUMMARY OF THE INVENTION

According to one aspect of the present invention, a capturing control apparatus for generating a high-dynamic-range (HDR) moving image by combining a first moving image captured by a first capturing unit and a second moving image captured by a second capturing unit, comprises: a first setting unit configured to set a first capturing condition in the first capturing unit and the second capturing unit when capturing a frame image to be used in HDR composition; a second setting unit configured to set a second capturing condition different from the first capturing condition; a capturing control unit configured to control capturing by the first capturing unit and the second capturing unit using the first capturing condition and the second capturing condition; a deriving unit configured to derive a correction parameter used to correct a position shift between the frame image included in the first moving image and the frame image included in the second moving image based on the frame image captured under the second capturing condition, which is included in each of the first moving image and the second moving image obtained by capturing control of the capturing control unit; and a combining unit configured to perform geometric correction processing for at least one of the first moving image and the second moving image using the correction parameter, and after the geometric correction processing, combine the first moving image and the second moving image.

The present invention provides a technique of enabling more preferable combined image generation.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 is a view showing an example of a GUI configured to set a capturing condition for HDR composition;

FIG. 5 is a view showing an example of a GUI configured to set a capturing condition for geometric correction;

FIG. 12 is a view showing an example of capturing condition information for geometric correction;

DESCRIPTION OF THE EMBODIMENTS

Preferred embodiments of the present invention will now be described in detail with reference to the accompanying drawings. Note that the embodiments to be described below are merely examples and are not intended to limit the scope of the present invention.

First Embodiment

As the first embodiment of a capturing control apparatus according to the present invention, a capturing system that obtains two moving images under different exposures using two cameras and performs HDR composition will be described below as an example.

Capturing System Configuration

Figure 1:
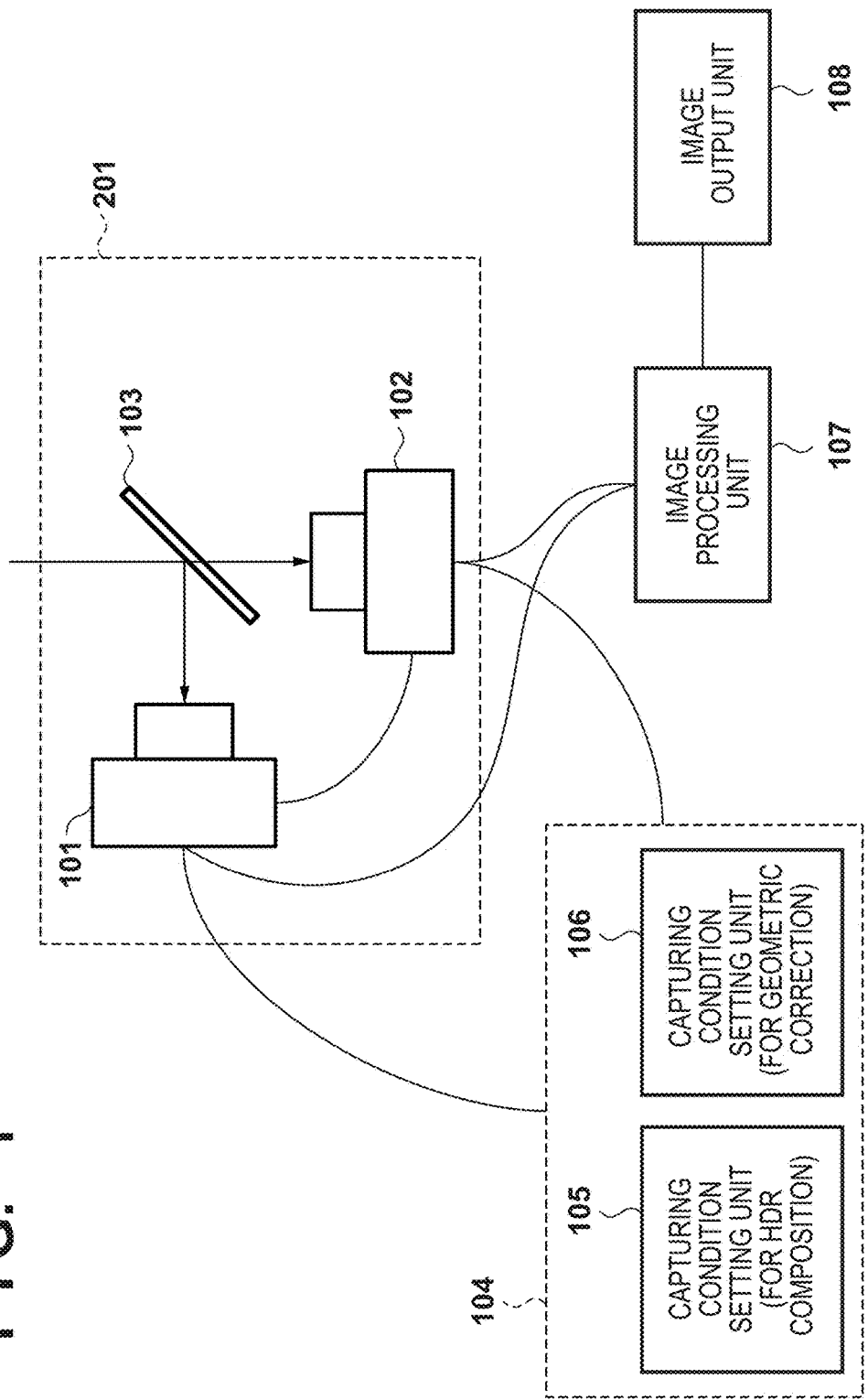
FIG. 1 is a block diagram showing the schematic arrangement of a capturing system according to the first embodiment.

FIG. 1 is a block diagram showing the schematic arrangement of a capturing system according to the first embodiment. The number of cameras used in this embodiment is not limited to two. However, a case of using two cameras each including an independent optical system will be described as an example for the descriptive convenience. The capturing system is formed by a capturing unit 201, a capturing condition setting application 104, an image processing unit 107, and an image output unit 108.

The capturing unit 201 is formed by a camera 101, a camera 102, and a half mirror 103. Although not illustrated in FIG. 1, the camera 101, the camera 102, and the half mirror 103 are attached to a camera rig.

The camera 101 is a low exposure capturing camera configured to capture a low brightness image under a relatively low exposure (small exposure amount). The camera 102 is a high exposure capturing camera configured to capture a high brightness image under a relatively high exposure (large exposure amount). The half mirror 103 divides the optical path by transmitting and reflecting light from a capturing target to enable simultaneous shooting/synchronous shooting by the cameras 101 and 102. Although not illustrated, the camera 101 includes an external or internal neutral density filter (ND filter). Here, the relative exposure amounts of the cameras 101 and 102 are assumed to be controlled by the ND filter. Note that the control can be either control of a shutter speed or control of the reflectance/transmittance of the half mirror itself as long as the relationship between the relative exposure amounts of the cameras 101 and 102 can be controlled. Alternatively, the control may be done by combining them.

In the capturing system, the cameras 101 and 102 are connected to each other by a GenLock (Generator Lock) port so as to be capable of synchronous shooting. The capturing condition setting application 104 is a PC terminal or a dedicated control terminal, and includes a capturing condition setting unit 105 that sets a capturing condition for HDR composition, and a capturing condition setting unit 106 that sets a capturing condition for geometric correction.

The capturing condition setting unit 105 sets the capturing condition of a frame image to be used in HDR composition for each camera. The capturing condition setting unit 106 sets the capturing condition of a frame image to derive a geometric correction parameter to be used for geometric correction of a moving image captured by each camera. The above-described two capturing conditions include information about the exposures of the cameras, as will be described later in detail. In addition, the capturing condition for geometric correction further includes information about the frame number of a target.

Moving image data captured by each camera is temporarily stored in a DRAM or SRAM of a PC or a dedicated board for image processing. The image processing unit 107 performs geometric correction processing and HDR composition processing for the stored moving image data. The image processing unit 107 may be implemented by a PC and a control program, or may be formed as a dedicated board on which an image processing circuit is mounted. The image output unit 108 outputs the moving image data that has undergone the HDR composition processing as an HDR moving image file. Note that the image processing unit 107 may be configured to output moving image data before composition and information used for geometric correction together with the HDR moving image file.

Capturing Processing Configuration

Figure 2:
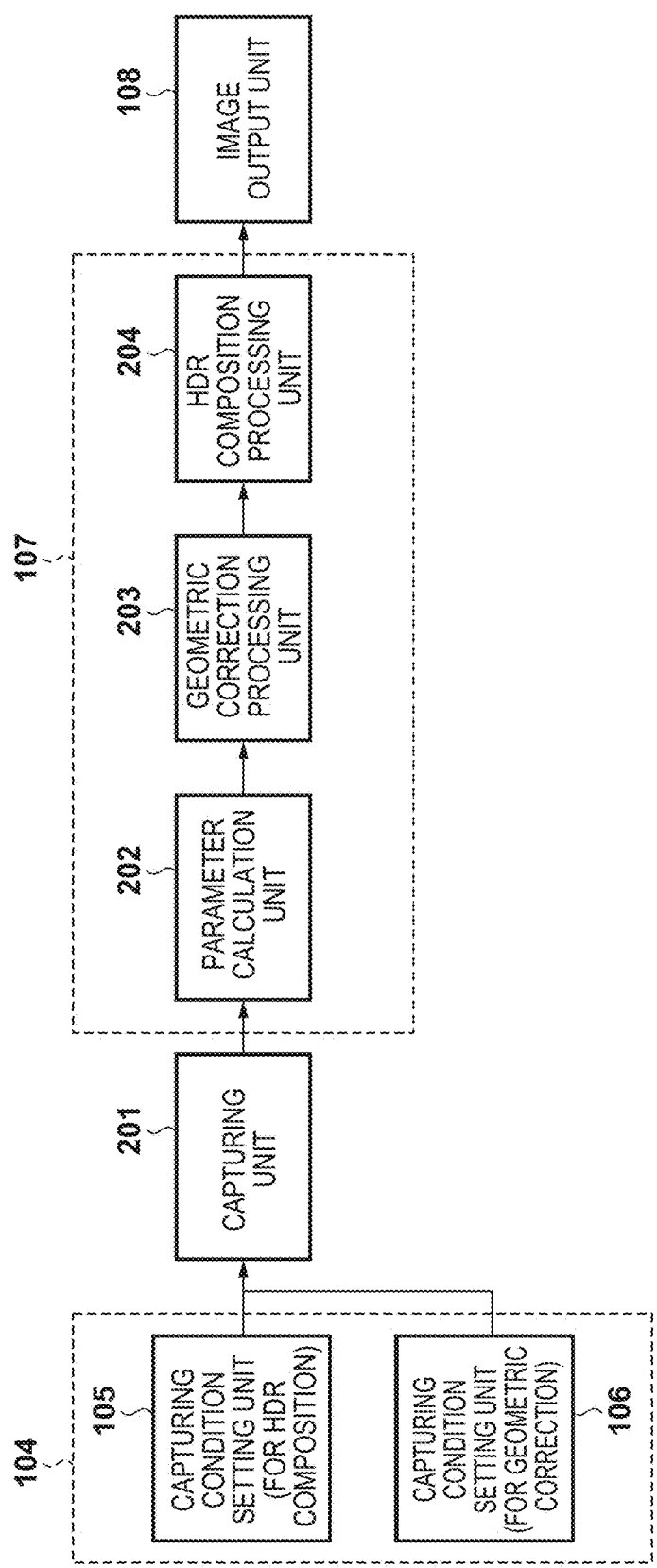
FIG. 2 is a block diagram showing the functional arrangement of the capturing system according to the first embodiment.

FIG. 2 is a block diagram showing the functional arrangement of the capturing system according to the first embodiment. As described with reference to FIG. 1, the user sets the capturing condition for HDR moving image capturing of each camera via the capturing condition setting unit 105. The capturing condition setting unit 105 reflects the set capturing conditions on the cameras 101 and 102. Similarly, the user sets the capturing condition of a frame image for geometric correction of each camera via the capturing condition setting unit 106. The capturing condition setting unit 106 reflects the set capturing conditions on the cameras 101 and 102.

Based on the set capturing conditions, the capturing unit 201 including the camera 101, the camera 102, and the half mirror 103 executes synchronous shooting. A parameter calculation unit 202 obtains moving images captured by the cameras 101 and 102 and the information of the capturing conditions for geometric correction (for example, the information of frame numbers), and calculates parameters necessary for geometric correction. A geometric correction processing unit 203 executes geometric correction processing for at least one of the moving images captured by the cameras 101 and 102 based on the calculated parameters. An HDR composition processing unit 204 performs HDR composition processing for the moving image after the geometric correction processing. The moving image that has undergone the HDR composition processing by the HDR composition processing unit 204 is output as a moving image file from the image output unit 108.

Capturing Processing Procedure

Figure 3:
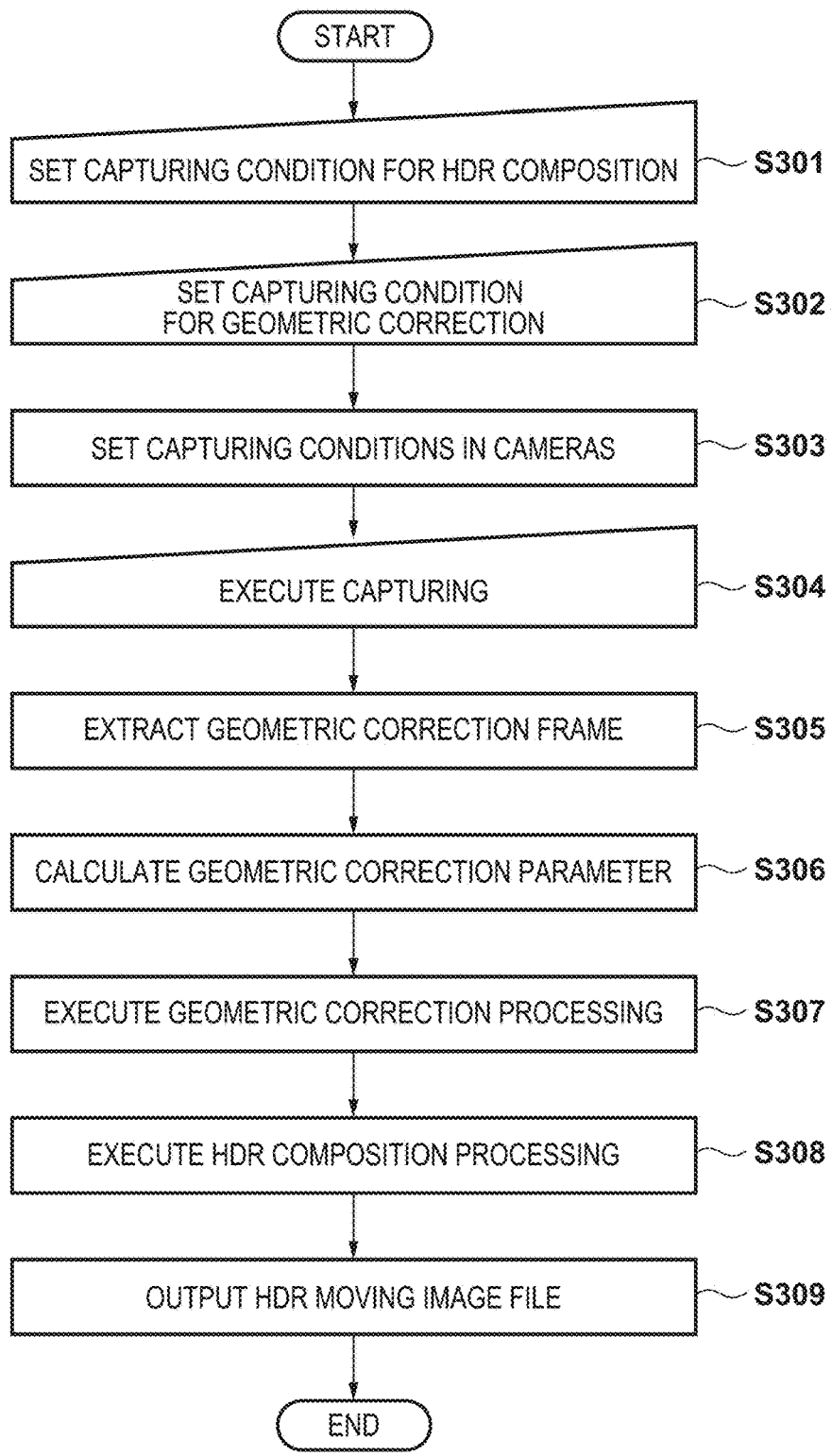
FIG. 3 is a flowchart showing processing according to the first embodiment.

FIG. 3 is a flowchart showing processing according to the first embodiment.

In step S301, the capturing condition setting unit 105 sets the capturing conditions of frame images for HDR composition based on an operation from the user. In step S302, the capturing condition setting unit 106 sets the capturing conditions of frame images for geometric correction based on an operation from the user. The capturing conditions include exposure conditions such as a shutter speed, an f-number, and an ND filter, as will be described later in detail with reference to FIGS. 4 and 5.

In step S303, the capturing condition setting units 105 and 106 record the HDR composition capturing conditions and the geometric correction capturing conditions in, for example, the internal memories of the cameras 101 and 102. In step S304, the capturing unit 201 executes synchronous shooting using the cameras 101 and 102 based on the capturing conditions set in step S303.

Figure 8:
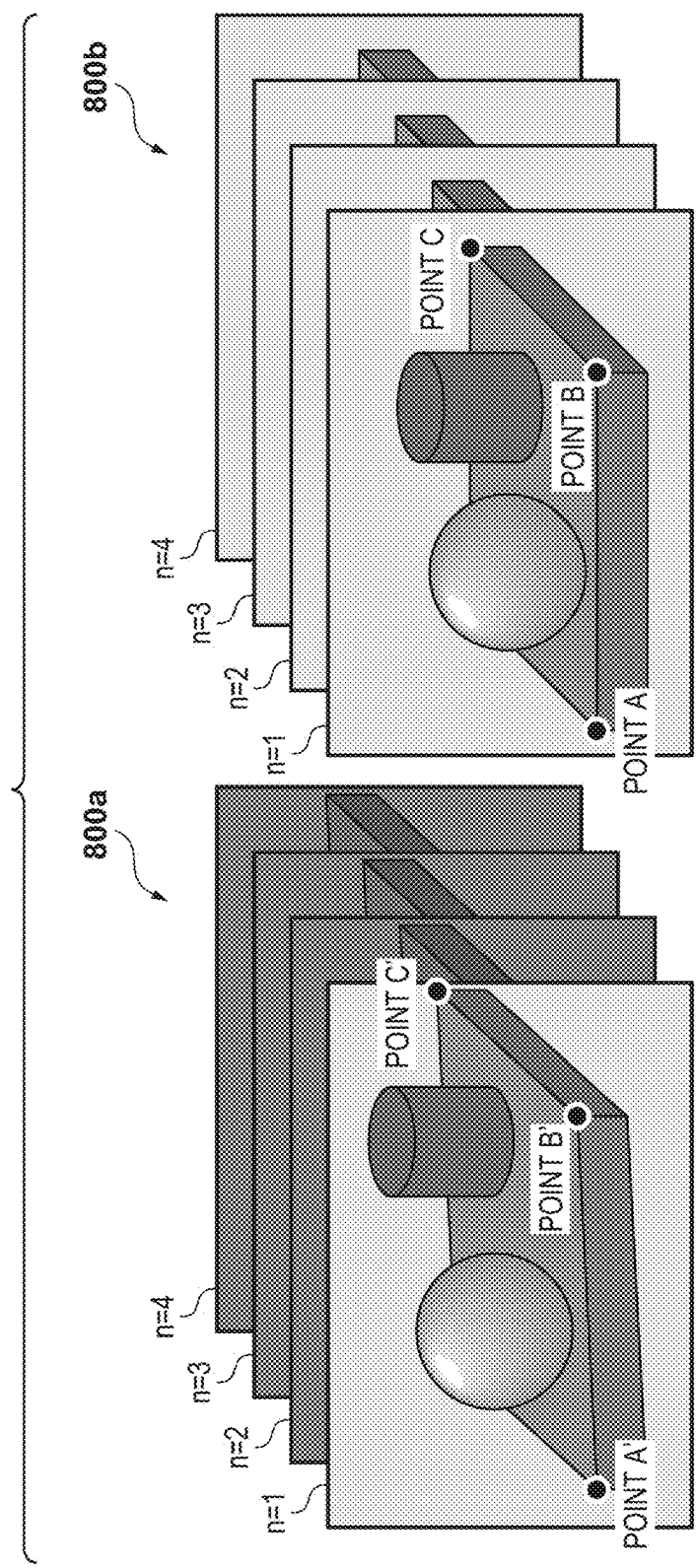
FIG. 8 is a view showing an example of moving images including a geometric correction frame.

FIG. 8 is a view showing an example of moving images including a geometric correction frame. That is, FIG. 8 is a view schematically showing moving image data captured based on the capturing conditions set in steps S301 an S302. Moving image data 800a exemplarily represents moving image data captured by the camera 101, moving image data 800b exemplarily represents moving image data captured by the camera 102, and n is the frame number. In the moving image data 800a, the frame of n=1 is a geometric correction frame, which is captured under a high exposure as compared to the remaining frames. That is, the frame of n=1 is a frame captured under a geometric correction capturing condition for suppressing shadow-detail loss or highlight-detail loss to improve the accuracy of corresponding point search.

In step S305, the parameter calculation unit 202 obtains a frame number designated as a geometric correction frame from the capturing unit 201 based on the information of the geometric correction capturing condition set in step S302. In step S306, the parameter calculation unit 202 extracts a frame image corresponding to the obtained frame number from each of the moving image data captured by the cameras 101 and 102, thereby calculating geometric correction parameters.

In step S307, the geometric correction processing unit 203 executes geometric correction processing for the frames other than the geometric correction frame using the calculated geometric correction parameters. Note that the geometric correction processing can be done using an arbitrary known method and is performed for at least one of the moving image data captured by the cameras 101 and 102. In step S308, the HDR composition processing unit 204 executes HDR composition processing for the moving image data that has undergone the geometric correction processing in step S307.

Details of Geometric Correction Processing

When a plurality of cameras are used as described above, a position shift of an object image may occur depending on the attachment accuracy of each camera.

Figure 6:
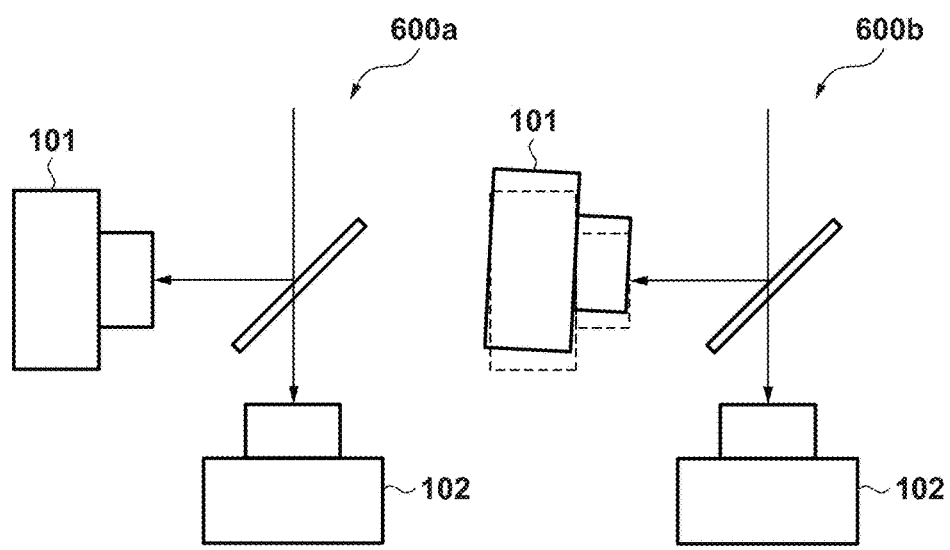
FIG. 6 is a view for explaining a shift of a camera posture.

FIG. 6 is a view for explaining a shift of a camera posture. A posture state 600a shows a correct camera posture. A posture state 600b represents a case in which the camera 101 is placed in a posture shifted from a correct posture (the dotted line in FIG. 6). In addition, the position shift direction or position shift amount changes every time the camera attaching operation is performed.

Figure 7:
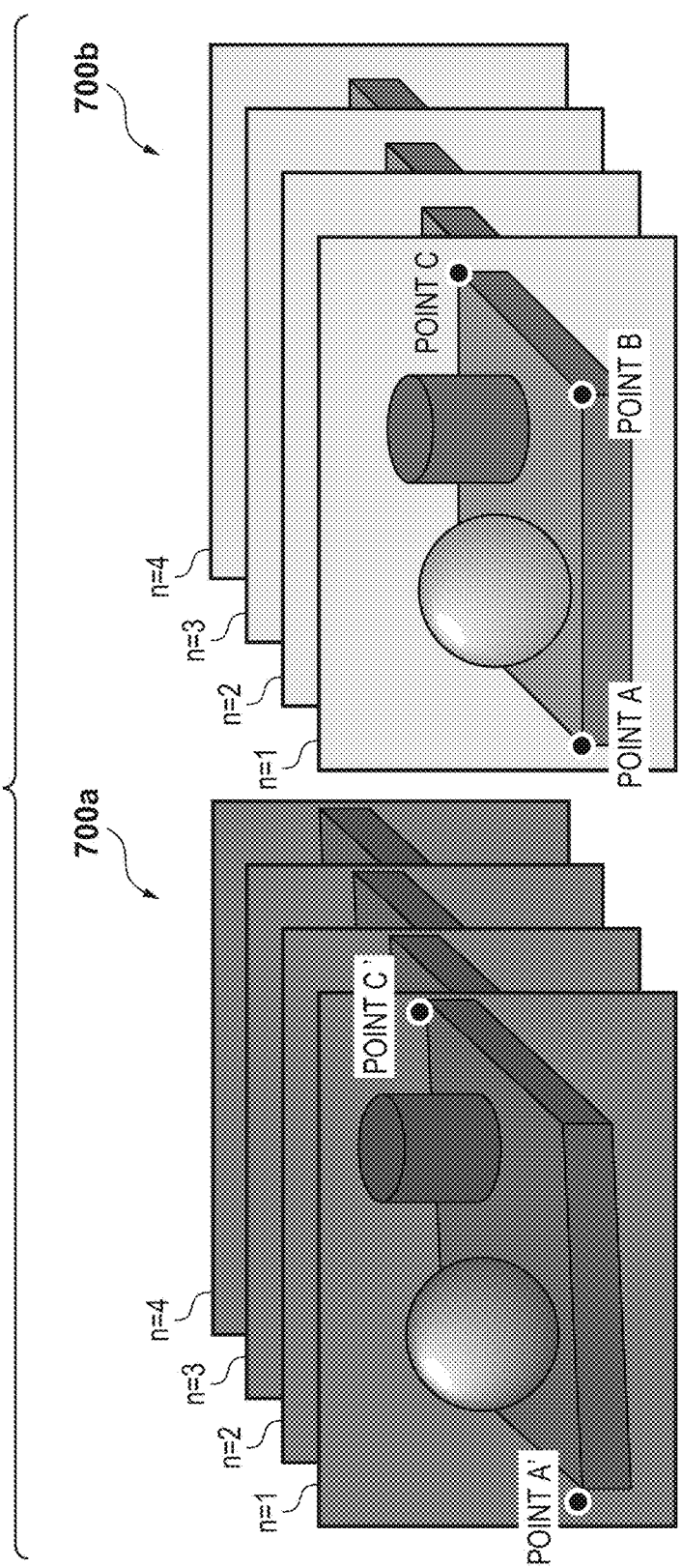
FIG. 7 is a view showing an example of moving images captured in a state in which the camera posture is shifted.

FIG. 7 is a view showing an example of moving images captured in a state in which the camera posture represented by the posture state 600b is shifted. In FIG. 7, n is the frame number. Moving image data 700a represents a moving image captured by the camera 101, and moving image data 700b represents a moving image captured by the camera 102.

In the moving image data 700a, a position shift and deformation of the object occur, as compared to the moving image data 700b. Hence, if HDR composition processing is performed using the two moving images, a multiple image is generated by the position shift and deformation of the object, resulting in lower image quality.

To prevent this, geometric correction is performed before the HDR composition processing is performed. As the method of geometric correction, well-known affine transformation can be used in general. To correct the shift or distortion that changes in every camera attachment, a transformation matrix as a geometric correction parameter needs to be obtained from the captured image. Note that the method of geometric correction need not always be affine transformation, and any other geometric correction method such as Helmert transformation may be used.

To obtain the transformation matrix of affine transformation, it is necessary to search for the coordinates of corresponding points between the images. However, if shadow-detail loss or highlight-detail loss occurs in the images, the detection accuracy in the corresponding point search lowers.

Points A, B, and C in the moving image data 700b are examples of feature points in the image captured by the camera 102. To extract the feature points, a known method of extracting a feature point based on brightness gradient information can be used. For example, SIFT (Scale Invariant Feature Transform) or HOG (Histogram of Oriented Gradients) can be used.

The same feature point extraction needs to be performed even for the moving image data 700a that is a low brightness image captured by the camera 101. However, shadow-detail loss (tones of a predetermined brightness or less are lost) may occur in the low brightness image, as indicated by the moving image data 700a, and an image with a small brightness gradient may be obtained. Even if image processing for contrast enhancement is performed, an image including much noise is obtained. As a result, if SIFT or HOG configured to extract a feature point based on the brightness gradient information is used, the accuracy of feature point extraction lowers. Points A' and C' in the moving image data 700a exemplarily represent occurrence of a position shift due to lowering of the detection accuracy. Also shown is that a point B' corresponding to the point B cannot be detected in the moving image data 700a. An inaccurate geometric correction parameter (transformation matrix) is calculated using the corresponding point detection result. As a result, the accuracy of geometric correction also lowers.

In the first embodiment, the capturing condition of a frame image used to derive the geometric correction parameter for geometric correction is set independently of the capturing condition for HDR composition. The geometric correction parameter (transformation matrix) is calculated based on a pair of frame images captured under the feature point.

FIG. 4 is a view showing an example of a GUI (Graphical User Interface) configured to set a capturing condition for HDR composition by the capturing condition setting unit 105. The user sets ON/OFF of checkboxes of capturing condition setting in accordance with the number of connected cameras. For "camera body No.", a camera as a capturing condition setting target is set. A form is shown here in which the capturing condition setting unit 105 automatically recognizes connected cameras and causes the user to select a setting target camera in a pull-down menu. A form that causes the user to directly input "camera body No." to a text box is also usable.

To reduce the effort of the user or reduce setting errors, even items (the shutter speed, the f-number, and the ND filter) to control the exposure of the camera are preferably automatically recognized and set in pull-down menus. The GUI shown in FIG. 4 is configured to set capturing conditions such as a frame rate and an ISO speed other than the items to control the exposure. If a "setting complete" button in the GUI is pressed, the capturing condition setting unit 105 reflects the set capturing conditions on the cameras 101 and 102.

Note that in FIG. 4, the shutter speed, the f-number, the frame rate, and the ISO speed are set to the same values for the cameras 101 and 102. However, a 6-stop ND filter (⅛ exposure amount) is set only for the camera 101 (camera body No. 101).

FIG. 5 is a view showing an example of a GUI configured to set a capturing condition for geometric correction by the capturing condition setting unit 106. Differences from the example shown in FIG. 4 are the settings of "frame number" and "reference camera body No."

In the setting of "frame number", a frame number to capture a geometric correction frame image is designated. Here, an example in which only one frame is set is shown. However, a plurality of frames may be set. The period (for example, 10 frames) of frame numbers to capture geometric correction images may be set. In the setting of "reference camera body No.", a camera that captures a reference image in obtaining a transformation matrix is designated.

Note that in FIG. 5, the shutter speed, the f-number, the frame rate, and the ISO speed are set to the same values for the cameras 101 and 102. Additionally, unlike the capturing conditions for the HDR moving image capturing shown in FIG. 4, the ND filter of the camera 101 is set to "none".

FIG. 8 is a view showing an example of moving images captured under the capturing conditions shown in FIGS. 4 and 5. When the capturing conditions as described above are set, shadow-detail loss is eliminated in the geometric correction frame (the frame of n=1 in FIG. 8). As a result, the accuracy of corresponding point search can be improved.

The parameter calculation unit 202 extracts, via the camera, the information of the frame number (the frame number in FIG. 5) set by the capturing condition setting unit 106. The parameter calculation unit 202 also extracts a frame image corresponding to the frame number from each camera.

The points A', B', and C' in the moving image data 800a are points corresponding to the points A, B, and C in the moving image data 800b. Unlike the example of the moving image data 700a, the feature point extraction accuracy improves. A geometric correction parameter (transformation matrix) is obtained using the corresponding points. As a captured image serving as a reference when obtaining the transformation matrix, an image of the camera set to "reference camera body No." in the GUI of FIG. 5 is used. Using the obtained transformation matrix, geometric correction (affine transformation) is performed for the frames other than the geometric correction frame.

Note that in FIG. 5, the frame number of the geometric correction frame is "1". However, the geometric correction frame need not always be the top frame, and may be a frame halfway through the moving image or the final frame. A plurality of frames may be selected. A text file in which a geometric correction frame number is set in advance may be loaded.

Figure 9:
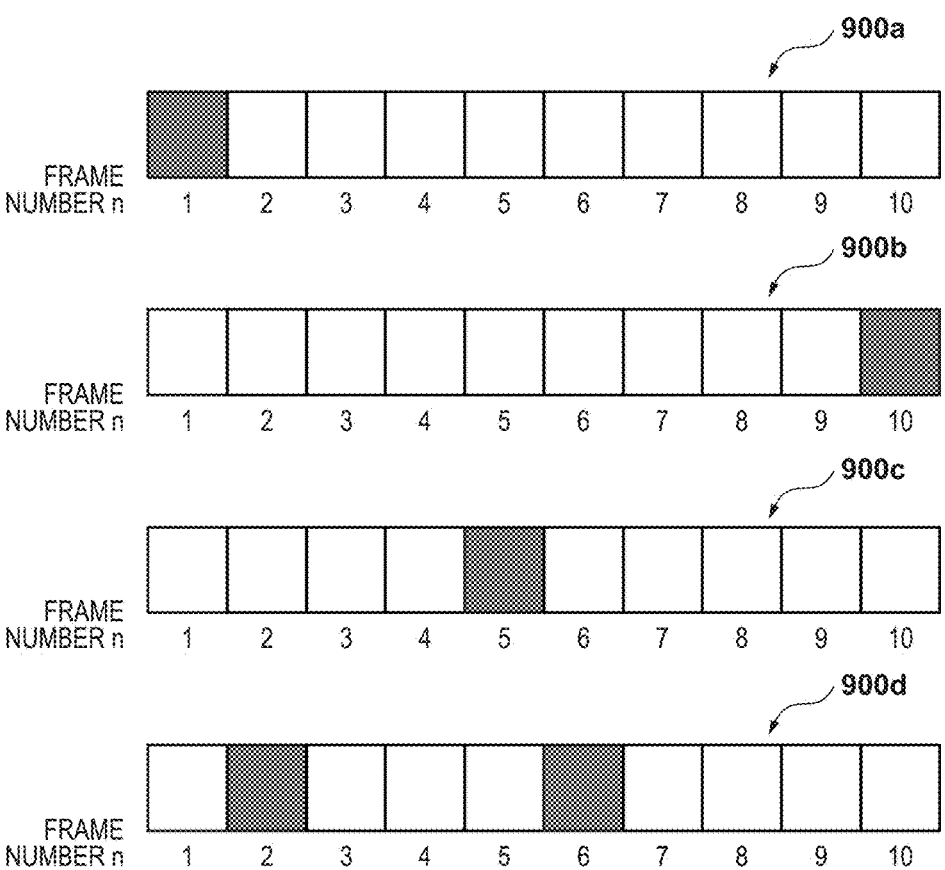
FIG. 9 is a view for explaining the position of a geometric correction frame in moving image data.

FIG. 9 is a view for explaining the position of a geometric correction frame in moving image data. A detailed example of a geometric correction application method will be described with reference to FIG. 9. Each gray frame in FIG. 9 represents a frame set as a geometric correction frame. Frames of frame numbers=1 to 10 will be referred to as a first frame to a 10th frame hereinafter.

A position setting 900a shows a case in which only the first frame on the top is selected as a geometric correction frame. In this case, using a geometric correction parameter calculated using the first frame, geometric correction processing is performed for the second and subsequent frames. Note that when performing HDR composition, the first frame may be deleted, or the first frame may be replaced with the second frame.

A position setting 900b shows a case in which only the final 10th frame is selected as a geometric correction frame. In this case, using a geometric correction parameter calculated using the 10th frame, geometric correction processing is performed for the first to ninth frames. Note that when performing HDR composition, the 10th frame may be deleted, or the 10th frame may be replaced with the 9th frame.

A position setting 900c shows a case in which only the fifth frame that is a frame halfway through is selected as a geometric correction frame. In this case, using a geometric correction parameter calculated using the fifth frame, geometric correction processing is performed for the first to fourth frames and the sixth to 10th frames. Note that when performing HDR composition, the fifth frame is generated by, for example, averaging the images of the fourth and sixth frames. The fifth frame can be generated either before HDR composition or after composition.

A position setting 900d shows a case in which a plurality of frames halfway through are selected as geometric correction frames. In this case, geometric correction parameters are calculated using the second and sixth frames. Using the geometric correction parameter calculated using the second frame, geometric correction processing is performed for the third to fifth frames. Similarly, using the geometric correction parameter calculated using the sixth frame, geometric correction processing is performed for the seventh to 10th frames. For the first frame without any geometric correction frame before the local frame, geometric correction processing is performed using the geometric correction parameter calculated using the second frame. Note that as in the case of the position setting 900c shown in FIG. 9, the second frame is generated by, for example, averaging the images of the first and third frames before HDR composition. The sixth frame is generated by, for example, averaging the images of the fifth and seventh frames.

As described above, a moving image file formed by the image frames that have undergone the geometric correction processing is output, and the geometric correction frames are not recorded in the moving image file 1 to be output.

In the above-described example, a method has been described, in which the accuracy of corresponding point search is improved by raising the exposure of the low exposure capturing camera when capturing a scene assumed to have many shadow-detail loss regions in the geometric correction frame. Conversely, when capturing a scene assumed to have many highlight-detail loss regions, the exposure of the high exposure capturing camera is lowered.

Additionally, to improve the accuracy of corresponding point search, an appropriate exposure may be obtained in advance by pre-capturing before actual capturing, and the exposure of each camera may be set to the appropriate exposure as the geometric correction frame capturing condition. In this case, a pre-capturing mode is provided, and the appropriate exposure condition is automatically reflected on the actual capturing.

Alternatively, a plurality of frames may be set as geometric correction frames, capturing of the plurality of geometric correction frames may be performed under different exposures, and geometric correction may be performed using frames with little shadow-detail loss or highlight-detail loss.

In the geometric correction processing capturing condition setting, only a frame number or only a condition concerning exposure may be set, unlike the example shown in FIG. 5. Alternatively, as in the GUI shown in FIG. 5, setting of only a frame number or only a condition concerning exposure may be permitted.

In an arrangement that sets only a frame number, capturing is performed by setting the exposure of the geometric correction frame of the camera on the low exposure capturing side to the exposure of the camera on the high exposure capturing side. Alternatively, capturing may be done under a preset exposure higher than an exposure expected to cause shadow-detail loss.

In an arrangement that sets only a condition concerning exposure, a geometric correction frame number is held in the capturing system in advance, and capturing is performed under an exposure set in the frame number. As for the geometric correction frame number extraction method in this case, preceding and subsequent frames are compared, and a frame in which the change in average brightness of the frame image is larger than a predetermined value is extracted. For example, a frame having a relatively high brightness is extracted.

HDR Composition Processing

Figure 10:
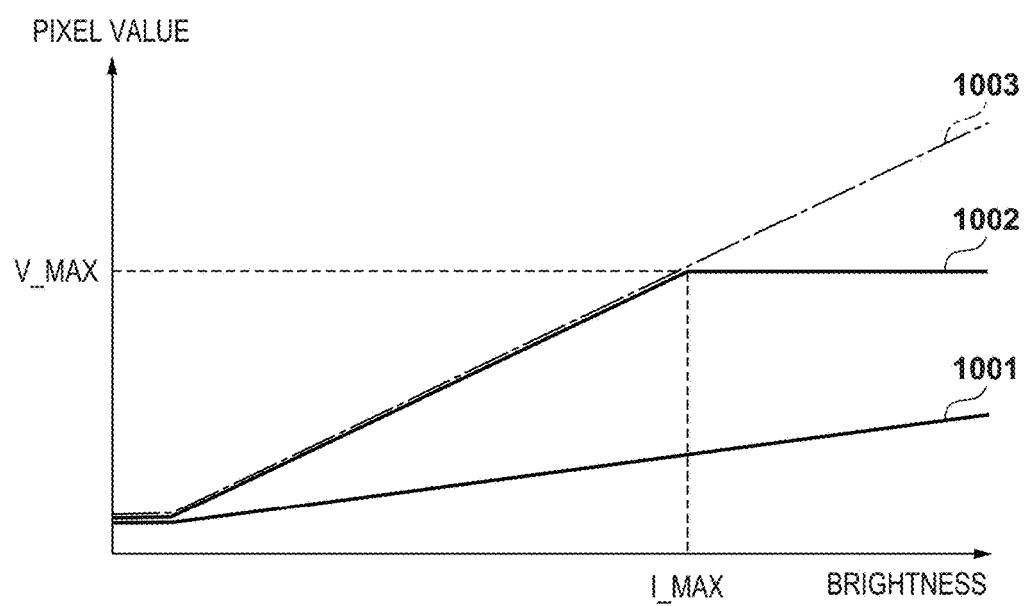
FIG. 10 is a graph showing the relationship between a scene brightness and a pixel value in HDR composition processing.

FIG. 10 is a graph showing the relationship between a scene brightness and a pixel value in HDR composition processing. For HDR composition by the HDR composition processing unit 204, an arbitrary known HDR composition processing method can be used.

A curve 1001 represents the relationship between the brightness and the pixel value in exposure setting of the camera 101, and a curve 1002 represents the relationship between the brightness and the pixel value in exposure setting of the camera 102. In the curve 1002, saturation occurs at a brightness I_MAX more than a recordable maximum pixel value V_MAX. In the curve 1001, although the pixel value is not saturated even if the brightness exceeds I_MAX, shadow-detail loss occurs on the low brightness side.

Considering these characteristics, in HDR composition, most simply, in the range where the brightness is equal to or lower than I_MAX, pixel data of the camera 102 is used. In the range where the brightness exceeds I_MAX, a value obtained by multiplying the pixel data of the camera 101 by a digital gain is used. Note that a curve 1003 represents the relationship between the pixel value and a brightness obtained by multiplying the curve 1001 by the digital gain. That is, the characteristic of the curve 1002 is used in the brightness range of I_MAX or less, and the characteristic of the curve 1003 is used in the brightness range higher than I_MAX.

As described above, according to the first embodiment, in the HDR capturing system using a plurality of cameras, capturing conditions for geometric correction are set separately from capturing conditions for HDR composition. A geometric correction parameter is derived based on a pair of frame images captured under the set capturing conditions for geometric correction. It is therefore possible to obtain a high-quality HDR-combined image while suppressing degradation caused by a position shift.

(Modification)

The arrangement according to the above-described first embodiment may be applied to panoramic composition processing (so-called stitching processing) of generating a wide-range (high-resolution) panoramic moving image by combining moving images captured by a plurality of cameras.

For example, when capturing a 360° panoramic image, a high brightness region where the brightness exceeds the D range of the capturing unit and a low brightness region coexist at a high possibility, and shadow-detail loss or highlight-detail loss readily occurs. To prevent this, capturing is performed using a plurality of cameras such that capturing regions partially overlap, and geometric correction processing is performed to suppress a shift by camera placement in the overlap region. Even in this processing, a corresponding point search is performed, and geometric correction is performed. Hence, if shadow-detail loss or highlight-detail loss occurs in the overlap region, the correction accuracy lowers.

As in the capturing in the form of HDR composition described above, a geometric correction frame is set, the frame is captured under an exposure different from that in the actual capturing. Accordingly, the corresponding point search accuracy can be improved by the geometric correction frame, and as a result, the geometric correction accuracy can be improved.

Second Embodiment

In the second embodiment, a method of temporarily recording a moving image file before geometric correction or HDR composition processing after capturing condition setting and capturing and separately performing image processing for the recorded image file will be described. A description of components and processing that are the same as in the first embodiment will be omitted.

Capturing System

Figure 11:
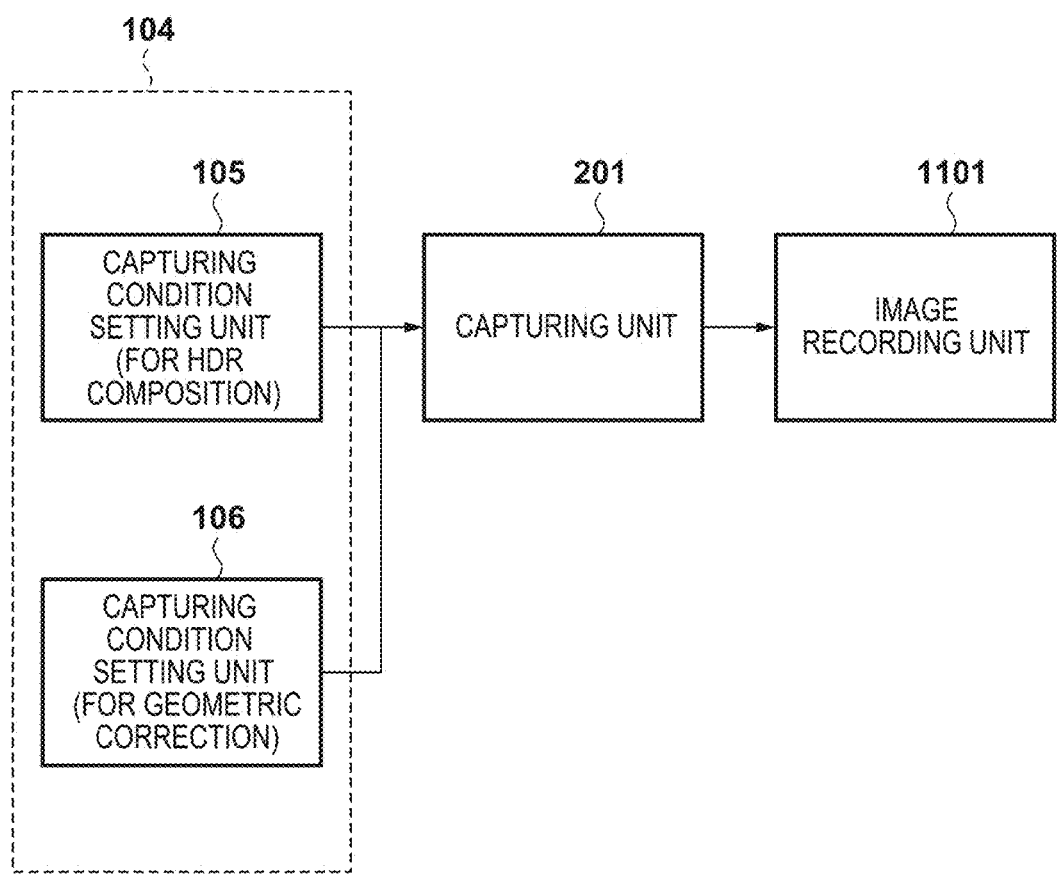
FIG. 11 is a block diagram showing the functional arrangement of a capturing system according to the second embodiment.

FIG. 11 is a block diagram showing the functional arrangement of a capturing system according to the second embodiment. A capturing condition setting unit 105 receives a capturing condition for HDR moving image capturing of each camera from the user and reflects the capturing conditions on cameras 101 and 102. Similarly, a capturing condition setting unit 106 receives a capturing condition for geometric correction processing of each camera from the user and reflects the capturing conditions on the cameras 101 and 102.

A capturing unit 201 executes synchronous shooting using the cameras 101 and 102 based on the set capturing conditions. Moving images captured by the cameras 101 and 102 and the information of the geometric correction capturing conditions are sent to an image recording unit 1101 and recorded as files. The image recording unit 1101 controls storage to store them as files suitable for the storage unit. The storage unit is, for example, a dedicated recorder connected to the camera 101 or 102, a nonvolatile medium such as a memory card, or the HDD of a PC or the like.

FIG. 12 is a view showing an example of capturing condition information for geometric correction. As shown in FIG. 12, capturing condition information set by the geometric correction capturing condition setting unit shown in FIG. 5 is recorded. Note that the camera used for capturing, the composition partner camera, and the camera body No. of the reference camera are recorded together. The capturing condition information may be saved as a text file separated from the moving image data or recorded as header information of the moving image data captured by the cameras 101 and 102.

Figure 13:
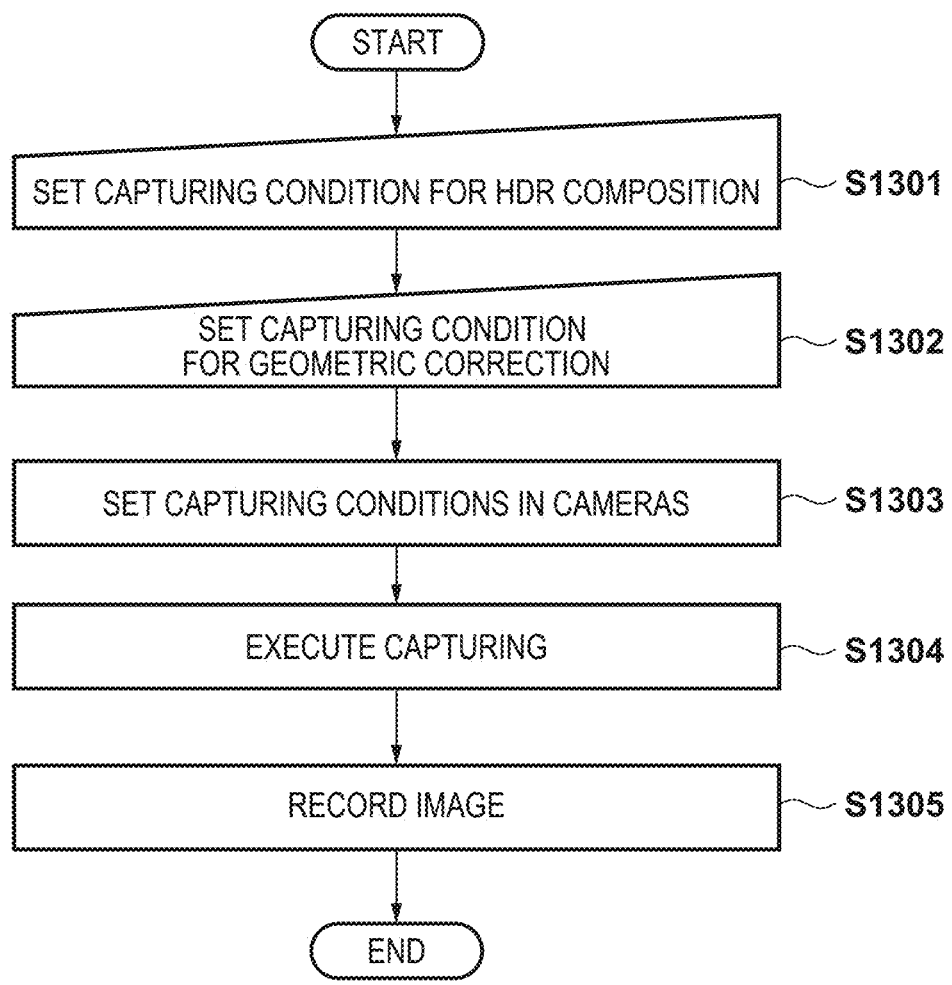
FIG. 13 is a flowchart showing capturing processing according to the second embodiment.

FIG. 13 is a flowchart showing capturing processing according to the second embodiment.

In step S1301, the capturing condition setting unit 105 receives the setting of the capturing condition for HDR composition from the user. In step S1302, the capturing condition setting unit 106 receives the setting of the capturing condition for geometric correction from the user.

In step S1303, the capturing condition setting units 105 and 106 set the set HDR composition capturing condition and the geometric correction capturing condition in each camera. In step S1304, the capturing unit 201 executes synchronous shooting based on the set capturing conditions. In step S1305, the image recording unit 1101 records captured moving image data and the capturing condition information.

Image Processing Apparatus

Figure 14:
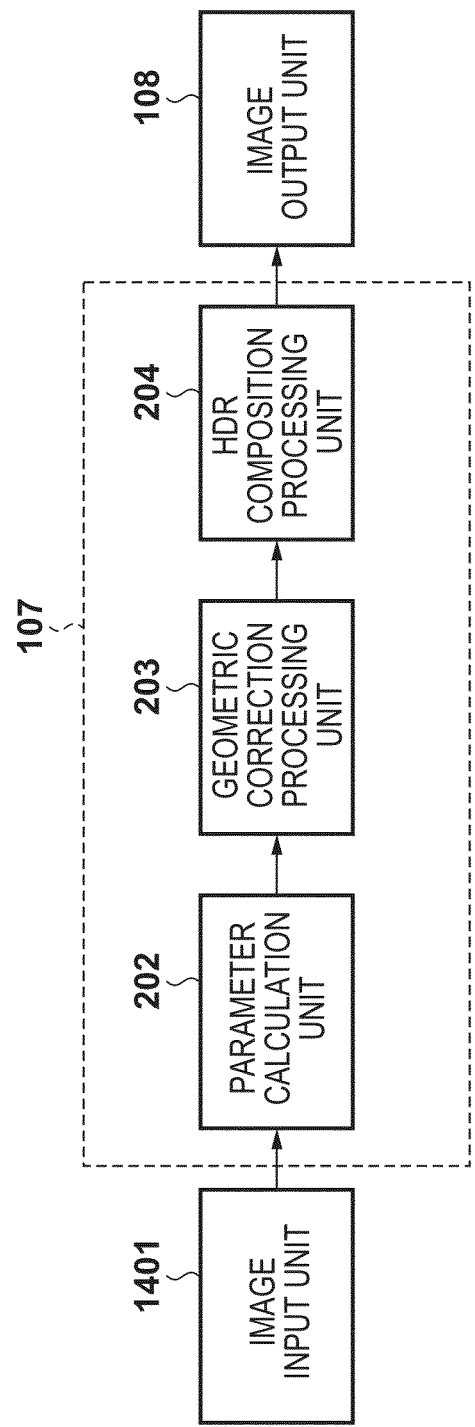
FIG. 14 is a block diagram showing the functional arrangement of an image processing unit according to the second embodiment.

FIG. 14 is a block diagram showing the functional arrangement of an image processing unit according to the second embodiment.

An image input unit 1401 obtains a plurality of moving image files as the processing target and capturing condition information from the image recording unit 1101. The image input unit 1401 is, for example, an application in a PC or an application in a dedicated apparatus in which an image processing circuit is mounted. The user inputs the moving image data of the processing target and the capturing condition information on this application. Note that if the capturing condition information is recorded in the header of the moving image data or the like, only the moving image data is selected.

A parameter calculation unit 202 calculates a geometric correction parameter based on the input moving image data and the capturing condition information. A geometric correction processing unit 203 executes geometric correction processing of the input moving image data based on the calculated geometric correction parameter. An HDR composition processing unit 204 performs HDR composition processing for the moving image data after the geometric correction processing. An image output unit 108 outputs the moving image data that has undergone the HDR composition processing as an HDR moving image file.

Figure 15:
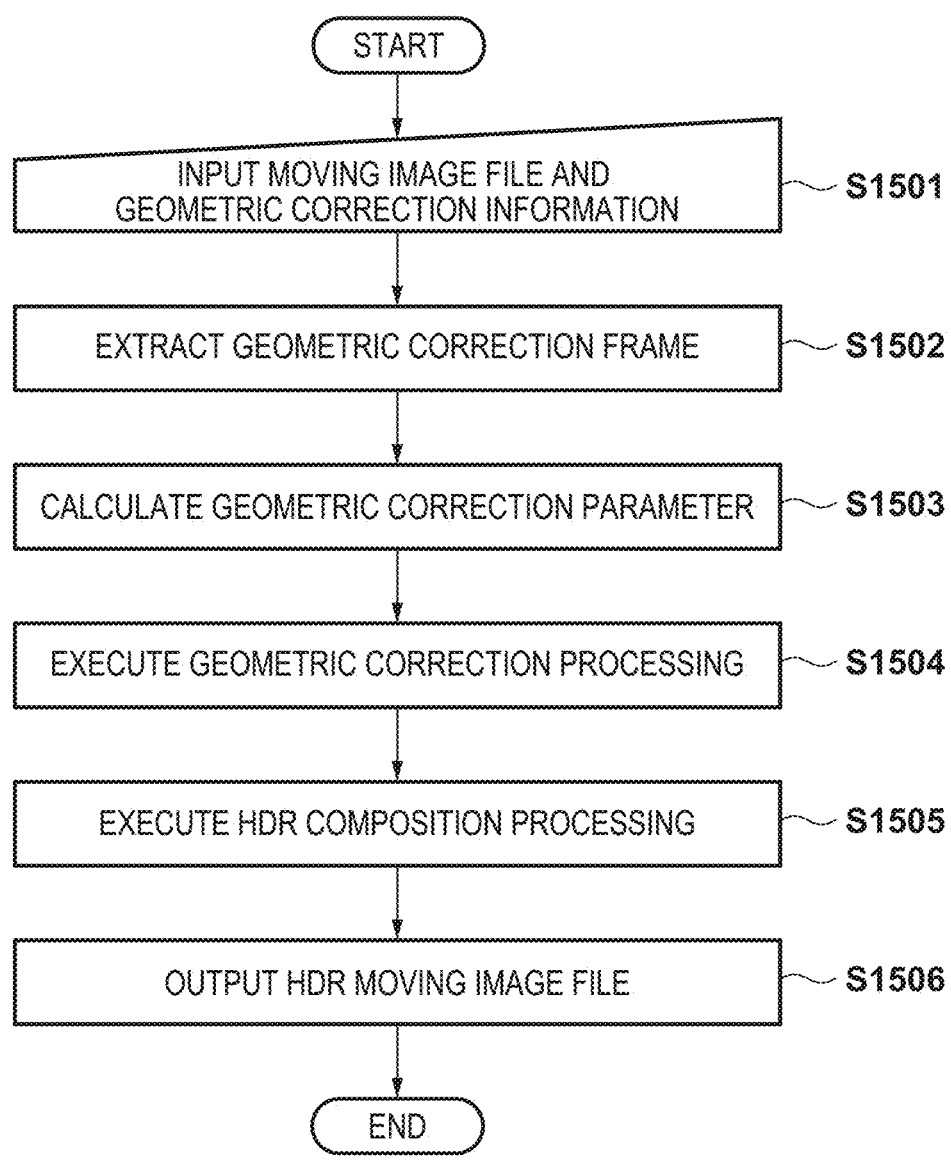
FIG. 15 is a flowchart showing image processing according to the second embodiment.

FIG. 15 is a flowchart showing image processing according to the second embodiment.

In step S1501, the image input unit 1401 inputs moving image data of a processing target and capturing condition information based on a user instruction. In step S1502, the parameter calculation unit 202 extracts a frame number designated as a geometric correction frame from the input capturing condition information. In step S1503, the parameter calculation unit 202 calculates a geometric correction parameter using a frame image corresponding to the extracted frame number. In step S1504, the geometric correction processing unit 203 executes geometric correction processing using the calculated geometric correction parameter. In step S1505, the HDR composition processing unit 204 executes HDR composition processing based on the moving image data that has undergone the geometric correction. In step S1506, the image output unit 108 outputs the moving image data that has undergone the HDR composition processing as an HDR moving image file.

As described above, according to the second embodiment, in the HDR capturing system using a plurality of cameras, capturing is performed by setting capturing conditions for geometric correction separately from capturing conditions for HDR composition. Captured data is recorded in the recording unit together with the capturing condition information. The image processing apparatus specifies a pair of frame images captured under the capturing conditions for geometric correction based on the capturing condition information recorded in the recording unit, and derives a geometric correction parameter. It is therefore possible to obtain a high-quality HDR-combined image whose degradation caused by a position shift is suppressed.

Third Embodiment

In the third embodiment, a form in which images divided using a prism or the like are captured by synchronous shooting using a plurality of sensors and HDR-combined will be described. A description of components and processing contents that are the same as in the first embodiment will be omitted, and different components and processes will be explained.

Capturing System

Figure 16:
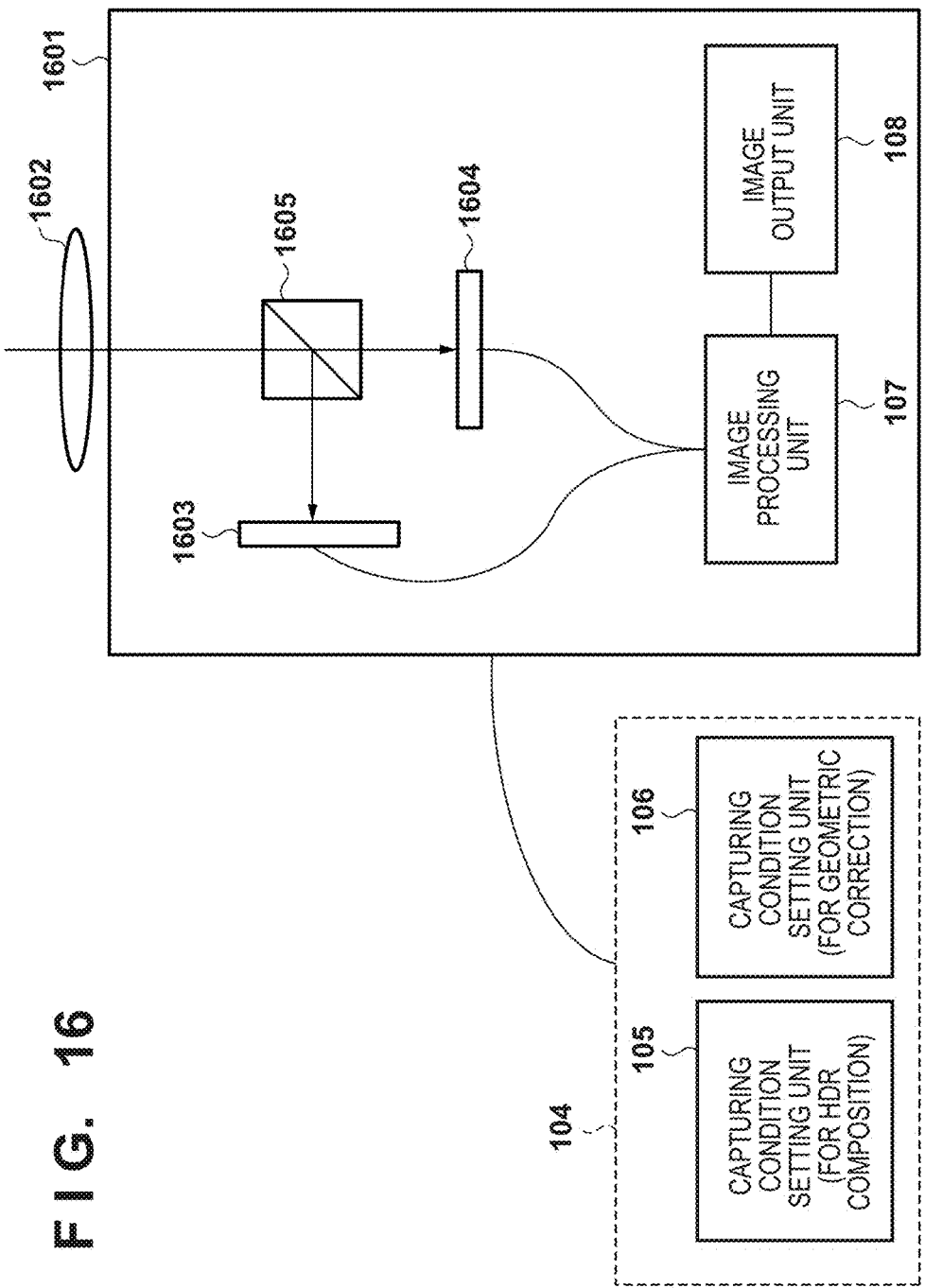
FIG. 16 is a block diagram showing the schematic arrangement of a capturing system according to the third embodiment.

FIG. 16 is a block diagram showing the schematic arrangement of a capturing system according to the third embodiment. The number of sensors used is not limited to two. However, a case of using two sensors will be described as an example for the descriptive convenience.

The capturing system performs synchronous shooting by two sensors that share an optical system including a lens 1602 and a prism 1605. A sensor 1603 for low exposure capturing is a sensor that performs capturing under a relatively low exposure, and a sensor 1604 for high exposure capturing is a sensor that performs capturing under a relatively high exposure. The prism 1605 transmits and reflects light from a capturing target to divide the optical path, thereby enabling simultaneous shooting/synchronous shooting by the sensors 1603 and 1604. Even in a multi-sensor system shown in FIG. 16, if the relative positional relationship of the optical components such as the lens, the prism, and the sensors shifts, the position shift of the object image may occur.

Although not illustrated, the sensor 1603 includes an external or internal neutral density filter (ND filter). Here, the relative exposure amounts of the sensors 1603 and 1604 are assumed to be controlled by the ND filter. Note that the control can be control of a shutter speed as long as the relationship between the relative exposure amounts of the sensors 1603 and 1604 can be controlled.

A capturing condition setting application 104 is a PC terminal or a dedicated control terminal, and includes a capturing condition setting unit 105 for HDR composition, and a capturing condition setting unit 106 for geometric correction. The capturing condition setting unit 105 sets a capturing condition for HDR moving image capturing for each sensor. The capturing condition setting unit 106 sets a capturing condition of a frame image used to calculate a geometric correction parameter. These capturing conditions include information about exposure, as in the first embodiment. In addition, the capturing condition for geometric correction further includes information about the frame number of a target.

An image processing unit 107 performs geometric correction processing and HDR composition processing for moving image data captured by each sensor. An image output unit 108 outputs the HDR moving image data generated by performing the HDR composition processing as an HDR moving image file.

As described above, according to the third embodiment, even in the multi-sensor system using two sensors that share the optical system, it is possible to obtain a high-quality HDR-combined image while suppressing degradation caused by a position shift.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-187474, filed Sep. 26, 2016, which is hereby incorporated by reference herein in its entirety.

What is claimed is:

1. A capturing control apparatus that generates a high-dynamic-range (HDR) moving image by combining a first moving image captured by a first capturing unit and a second moving image captured by a second capturing unit, the capturing control apparatus comprising:
   a memory configured to store instructions; and
   a processor configured to execute the instructions stored in memory to provide:
   a first setting unit configured to set a first capturing condition in the first capturing unit and the second capturing unit when capturing a first frame image pair to be used in HDR composition;
   a second setting unit configured to set a second capturing condition, different from the first capturing condition, in the first capturing unit and the second capturing unit when capturing a second frame image pair to be used in deriving a geometric correction parameter;
   a capturing control unit configured to control capturing of the first moving image by the first capturing unit and the second moving image by the second capturing unit by capturing at least one first frame image pair using the first capturing condition and at least one second frame image pair using the second capturing condition;
   a deriving unit configured to derive the geometric correction parameter used to correct a position shift between a frame image of the first frame image pair included in the first moving image and another frame image of the first frame image pair included in the second moving image based on frame images of the second frame image pair captured under the second capturing condition, one frame image of the second frame image pair being included in each of the first moving image and the second moving image; and
   a combining unit configured to perform geometric correction processing for at least one of the frame image of the first frame image pair included in the first moving image and the another frame image of the first frame image pair included in the second moving image using the derived geometric correction parameter based on the second frame image pair, and after the geometric correction processing, combine at least the first frame image pair included in the first moving image and the second moving image to generate the HDR moving image,
   wherein each of the first capturing condition and the second capturing condition include a first exposure condition for the first capturing unit and a second exposure condition for the second capturing unit,
   wherein, in the first capturing condition, the first exposure condition for the first capturing unit is different from the second exposure condition for the second capturing unit, and
   wherein, in the second capturing condition, at least one of the first exposure condition or the second exposure condition is higher than in the first capturing condition when capturing a scene that has shadow-detail loss regions or lower than in the first capturing condition when capturing a scene that has highlight-detail loss regions.

2. The apparatus according to claim 1, wherein
   the second setting unit is further configured to set a frame number to capture using the second capturing condition, and
   the deriving unit is configured to extract, based on the frame number, the one frame image of the second frame image pair captured under the second capturing condition, which is included in each of the first moving image and the second moving image obtained by capturing control of the capturing control unit.

3. The apparatus according to claim 1, wherein
   the first setting unit is configured to set the first capturing condition such that the first capturing unit captures a low brightness image to be used in the HDR composition, and the second capturing unit captures a high brightness image to be used in the HDR composition, and
   the deriving unit is configured to extract, as the one frame image of the second frame image pair captured under the second capturing condition, a frame image having a relatively high brightness of a plurality of frame images included in the first moving image obtained by capturing control of the capturing control unit.

4. The apparatus according to claim 1, wherein in the second capturing condition, an exposure condition for the first capturing unit is the same as an exposure condition for the second capturing unit.

5. The apparatus according to claim 1, wherein the first capturing unit and the second capturing unit respectively comprise cameras that include independent optical systems or sensors that share an optical system.

6. The apparatus according to claim 1, wherein the combining unit is configured to perform panoramic composition processing after the geometric correction processing.

7. A method of controlling a capturing control apparatus that generates a high-dynamic-range (HDR) moving image by combining a first moving image captured by a first capturing unit and a second moving image captured by a second capturing unit, the method comprising:
   setting a first capturing condition in the first capturing unit and the second capturing unit when capturing a first frame image pair to be used in HDR composition;
   setting a second capturing condition, different from the first capturing condition, in the first capturing unit and the second capturing unit when capturing a second frame image pair to be used in deriving a geometric correction parameter;
   controlling capturing of the first moving image by the first capturing unit and the second moving image by the second capturing unit by capturing at least one first frame image pair using the first capturing condition and at least one second frame image pair using the second capturing condition;
   deriving the geometric correction parameter used to correct a position shift between a frame image of the first frame image pair included in the first moving image and another frame image of the first frame image pair included in the second moving image based on frame images of the second frame image pair captured under the second capturing condition, one frame image of the second frame image pair being included in each of the first moving image and the second moving image; and
   performing geometric correction processing for at least one of the frame image of the first frame image pair included in the first moving image and the another frame image of the first frame image pair included in the second moving image using the derived geometric correction parameter based on the second frame image pair, and after the geometric correction processing, combining at least the first frame image pair included in the first moving image and the second moving image to generate the HDR moving image, wherein each of the first capturing condition and the second capturing condition include a first exposure condition for the first capturing unit and a second exposure condition for the second capturing unit, wherein, in the first capturing condition, the first exposure condition for the first capturing unit is different from the second exposure condition for the second capturing unit, and wherein, in the second capturing condition, at least one of the first exposure condition or the second exposure condition is higher than in the first capturing condition when capturing a scene that has shadow-detail loss regions or lower than in the first capturing condition when capturing a scene that has highlight-detail loss regions.

8. A non-transitory computer-readable recording medium storing a program that causes a computer to function as a capturing control apparatus that generates a high-dynamic-range (HDR) moving image by combining a first moving image captured by a first capturing unit and a second moving image captured by a second capturing unit, the program comprising:

setting a first capturing condition in the first capturing unit and the second capturing unit when capturing a first frame image pair to be used in HDR composition;

setting a second capturing condition, different from the first capturing condition, in the first capturing unit and the second capturing unit when capturing a second frame image pair to be used in deriving a geometric correction parameter;

controlling capturing of the first moving image by the first capturing unit and the second moving image by the second capturing unit by capturing at least one first frame image pair using the first capturing condition and at least one second frame image pair using the second capturing condition;

deriving the geometric correction parameter used to correct a position shift between a frame image of the first frame image pair included in the first moving image and another frame image of the first frame image pair included in the second moving image based on frame images of the second frame image pair captured under the second capturing condition, one frame image of the second frame image pair being included in each of the first moving image and the second moving image; and performing geometric correction processing for at least one of the frame image of the first frame image pair included in the first moving image and the another frame image of the first frame image pair included in the second moving image using the derived geometric correction parameter based on the second frame image pair, and after the geometric correction processing, combining at least the first frame image pair included in the first moving image and the second moving image to generate the HDR moving image, wherein each of the first capturing condition and the second capturing condition include a first exposure condition for the first capturing unit and a second exposure condition for the second capturing unit, wherein, in the first capturing condition, the first exposure condition for the first capturing unit is different from the second exposure condition for the second capturing unit, and wherein, in the second capturing condition, at least one of the first exposure condition or the second exposure condition is higher than in the first capturing condition when capturing a scene that has shadow-detail loss regions or lower than in the first capturing condition when capturing a scene that has highlight-detail loss regions.

9. The apparatus according to claim 1, wherein one frame image of the second frame image pair is a top frame in each of the first moving image and the second moving image.

10. The apparatus according to claim 1, wherein one frame image of the second frame image pair is a final frame in each of the first moving image and the second moving image.

11. The apparatus according to claim 1, wherein,
in the second capturing condition, the first exposure condition for the first capturing unit and the second exposure condition for the second capturing unit are the same as the first exposure condition for the first capturing unit in the first capturing condition.

* * * * *